United States Patent [19]
Koyama

[11] Patent Number: 5,353,279
[45] Date of Patent: Oct. 4, 1994

[54] ECHO CANCELER
[75] Inventor: Tetsu Koyama, Tokyo, Japan
[73] Assignee: NEC Corporation, Tokyo, Japan
[21] Appl. No.: 935,199
[22] Filed: Aug. 26, 1992
[30] Foreign Application Priority Data
Aug. 29, 1991 [JP] Japan .................................. 3-218999
[51] Int. Cl.$^5$ .......................... H04B 3/23; H04M 1/00
[52] U.S. Cl. .................................. 370/32.1; 379/410; 379/411; 375/99
[58] Field of Search ................ 370/32, 32.1; 379/402, 379/406, 410, 411; 375/14, 99, 118

[56] References Cited
U.S. PATENT DOCUMENTS

| | | | |
|---|---|---|---|
| 4,535,206 | 8/1985 | Falconer | 370/32.1 |
| 4,742,510 | 5/1988 | Quatieri, Jr. et al. | 370/32.1 |
| 4,935,919 | 6/1990 | Hiraguchi | 370/32.1 |
| 4,965,823 | 10/1990 | Nakagawa et al. | 379/411 |
| 4,972,467 | 11/1990 | Nakagawa et al. | 379/411 |
| 5,018,134 | 5/1991 | Kokubo et al. | 370/32.1 |

*Primary Examiner*—Stephen Chin
*Assistant Examiner*—Young Tse
*Attorney, Agent, or Firm*—Foley & Lardner

[57] ABSTRACT

A frame pattern inserter inserts a frame pattern generated by a frame pattern generator periodically into a signal to be transmitted. An echo canceling circuit generates a pseudoecho from the signal to be transmitted with the frame pattern inserted therein and an error signal. A timing controller extracts from a received signal a timing signal to control the frame pattern generator, the frame pattern inserter, and the echo canceling circuit, and outputs a phase signal indicating whether jitter of the timing signal is generated as a leading phase shift or a lagging phase shift. A jitter echo canceling circuit generates a pseudojitter echo from the error signal and the phase signal. The timing controller controls the timing signal to cause the jitter to be generated immediately after the frame pattern is inserted into the signal to be transmitted.

3 Claims, 5 Drawing Sheets

ECHO CANCELER

BACKGROUND OF THE INVENTION

1. Field of the Invention

The present invention relates to an echo canceler to be interposed between a transmitter and a receiver of a bidirectional digital transmission device connected to a subscriber's line in an ISDN (integrated-services digital network) or the like, for generating a pseudoecho from a signal to be transmitted and an error signal to cancel an echo that is reflected from the transmitter toward the receiver.

2. Description of the Prior Art

Generally, echo cancelers are used to cancel echoes in bidirectional digital communications over subscribers' lines.

As shown in FIG. 1 of the accompanying drawings, a conventional echo canceler comprises a coder circuit 31, a driver circuit 32, a hybrid circuit 33, an echo canceling circuit, 34, and an adder 35.

A binary signal supplied to the echo canceler is applied to the coder circuit 31, which converts the supplied binary signal into a quaternary signal, or a 2B1Q signal, that comprises a 2-bit signal and represents any one of four states which the 2-bit signal can have. The converted quaternary signal is applied to the driver circuit 32 and the echo canceling circuit 34. The quaternary signal applied to the driver circuit 32 is transmitted through the hybrid circuit 33 to a subscriber's line 36. The transmitted signal received from the subscriber's line 36 is applied through the hybrid circuit 33 to the adder 35. The transmitted signal that has been received contains a quaternary signal (echo) which cannot be separated by the hybrid circuit 33.

The echo canceling circuit 34 is supplied with the transmitted signal and the quaternary signal, and generates a pseudoecho signal which is of the same waveform as of and opposite polarity to the echo contained in the transmitted signal. The pseudoecho signal is then applied to the adder 35 and added thereby to the transmitted signal. The sum signal is outputted from the adder 35 as a received signal.

The echo canceling circuit 34 comprises an adaptive digital filter having a tapped delay line for outputting the pseudoecho signal in response to the transmitted signal, a correlator for correlating the transmitted signal and the remaining echo signal contained in the received signal, and a multiplier for adjusting the tap coefficient of the tapped delay line based on an output signal from the correlator.

However, a conventional echo canceler has the disadvantage that if its operation clock signal experiences jitter, the pseudoecho signal and the actual echo will be displaced in timing from each other by an amount corresponding to the jitter and consequently, the echo canceler will fail to sufficiently cancel out the echo.

SUMMARY OF THE INVENTION

It is an object of the present invention to provide an echo canceler capable of sufficiently canceling out an echo even if the operation clock signal suffers jitter.

According to the present invention, there is provided an echo canceler for connection between a transmitter and a receiver of a bidirectional digital transmission device connected to a subscriber's line for generating a pseudoecho from a signal to be transmitted and an error signal to cancel an echo that is reflected from the transmitter toward the receiver, the echo canceler comprising frame pattern generating means for generating a frame pattern, frame pattern inserting means for inserting the frame pattern periodically into a signal to be transmitted, echo canceling means for generating a pseudoecho from the signal to be transmitted with the frame pattern inserted therein and an error signal, timing controlling means for extracting from a received signal a timing signal to control the frame pattern generating means, the frame pattern inserting means, and echo canceling means, and for outputting a phase signal indicative as to whether jitter of the timing signal is generated as a leading phase shift or a lagging phase shift, jitter echo canceling means for generating a pseudojitter echo from the error signal and the phase signal, first adding means for adding the pseudoecho to the transmitted signal, second adding means for adding the pseudojitter echo to an output signal from the first adding means to output the received signal, and multiplying means for multiplying the received signal by a predetermined value to output the error signal, the timing controlling means comprising means for controlling the timing signal to cause the jitter thereof to be generated immediately after the frame pattern is inserted into the signal to be transmitted.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
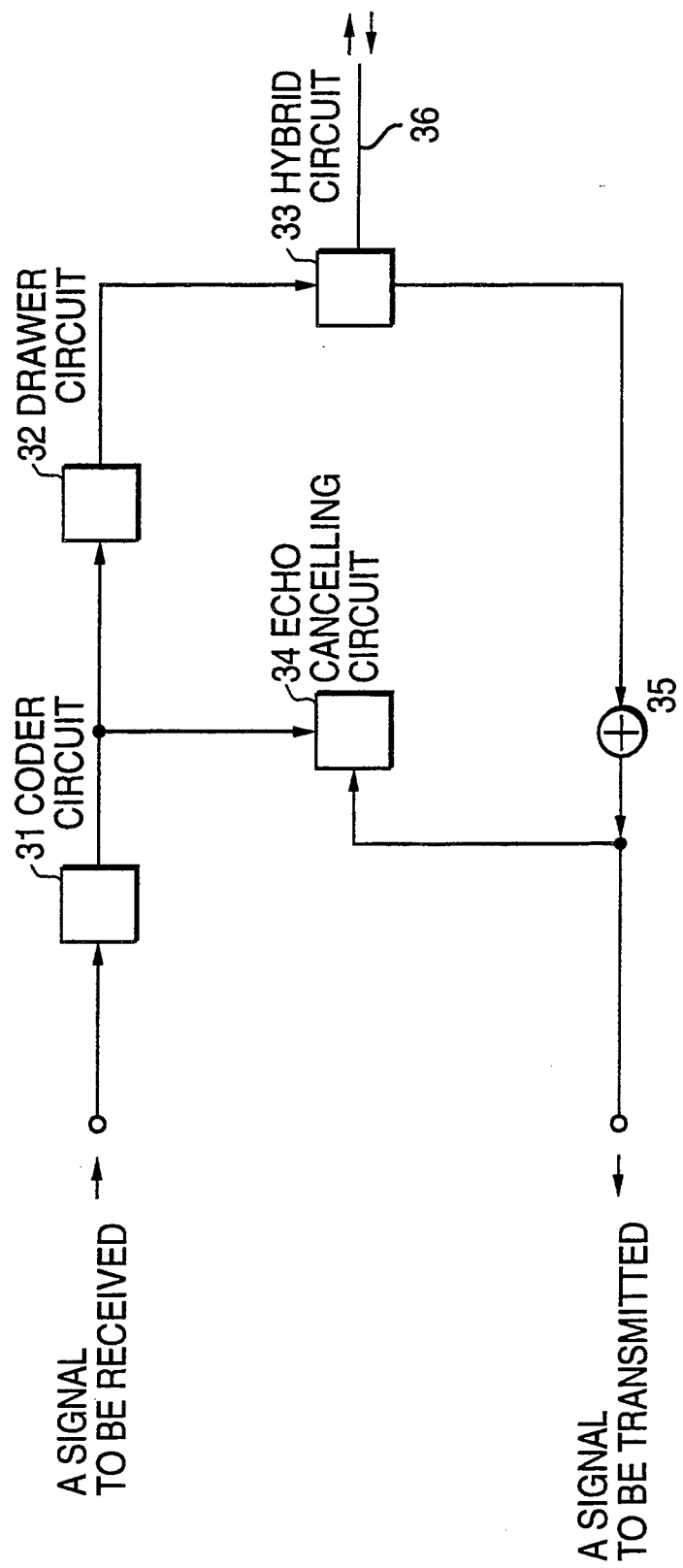
FIG. 1 is a block diagram of a conventional echo canceler.
Figure 2:
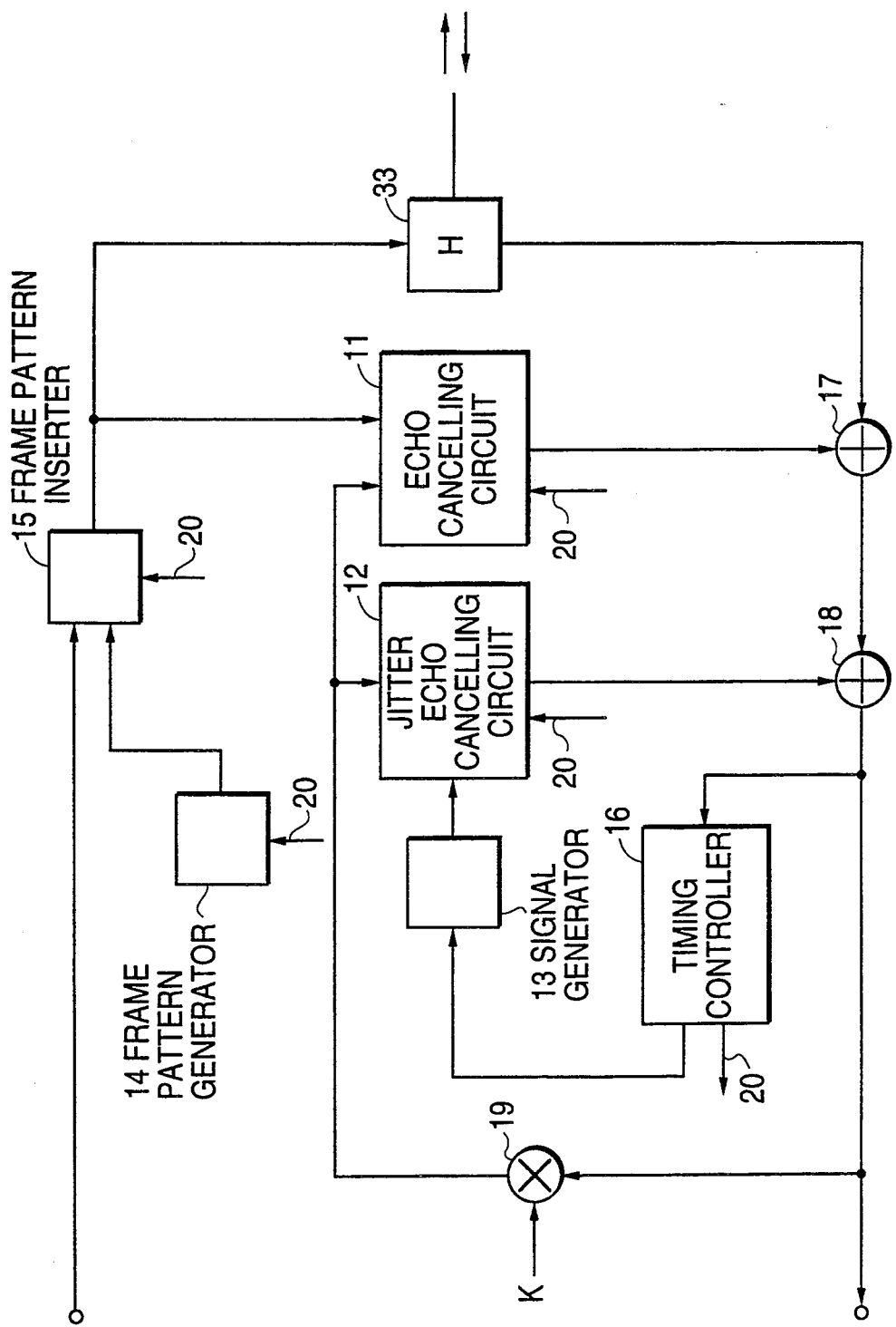
FIG. 2 is a block diagram of an echo canceler according to the present invention.

As shown in FIG. 2, an echo canceler according to the present invention comprises an echo canceling circuit 11, a jitter echo canceling circuit 12, a signal generator 13 for generating an input signal to be applied to the jitter echo canceling circuit 12, a frame pattern generator 14, a frame pattern inserter 15, a timing controller 16, a pair of adders 17, 18, a multiplier 19, and a hybrid circuit 33.

Figure 3:
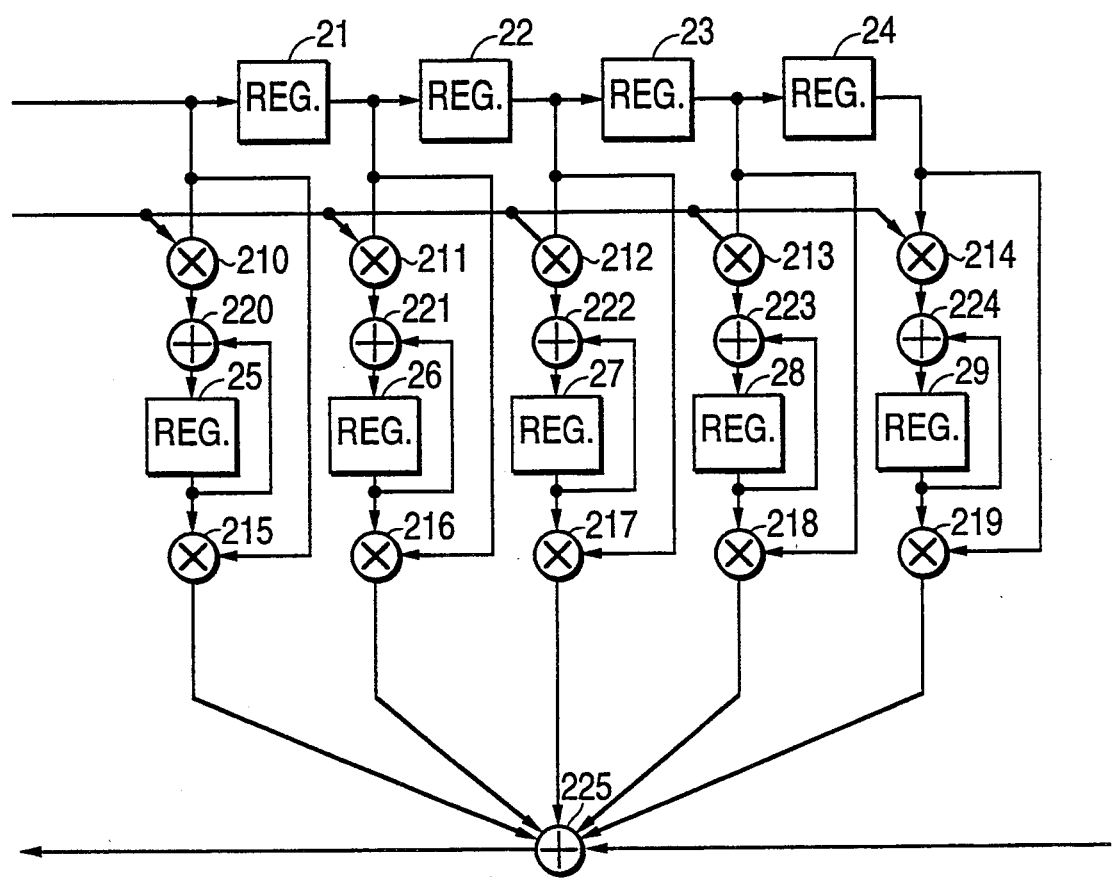
FIG. 3 is a block diagram of an adaptive digital filter of an echo canceling circuit and a jitter echo canceling circuit in the echo canceler shown in FIG. 2.

The echo canceling circuit 11 and the jitter echo canceling circuit 12 each comprise an adaptive digital filter. As shown in FIG. 3, the adaptive digital filter comprises a plurality of registers 21 through 29, a plurality of multipliers 210 through 219, a plurality of adders 220 through 225. The number of taps of the adaptive digital filter is not limited to that of the illustrated example. The echo canceling circuit 11 and the jitter echo canceling circuit 12 have different numbers of taps.

A signal to be transmitted is supplied to the frame pattern inserter 15 which is supplied periodically with a fixed frame pattern from the frame pattern generator 14. The frame pattern inserter 15 inserts the frame pattern into the signal to be transmitted and outputs the signal with the frame pattern inserted therein. The frame pattern generator 14 and the frame pattern inserter 15 are controlled by a timing signal 20 from the timing controller 16 so that the frame pattern inserter 15 inserts the frame pattern periodically into the signal to be transmitted.

The output signal from the frame pattern inserter 15 is sent through the hybrid circuit 33 to a transmission line. The output signal from the frame pattern inserter 15 is also supplied to the echo canceler 11. The echo canceler 11 serves to cancel when no jitter is being generated. When no jitter is being generated, the echo canceler 11 produces a pseudoecho signal from the output signal from the frame pattern inserter 15 and an error signal.

The timing controller 16 comprises a digital PLL (Phase-Locked Loop) for extracting a timing signal 20 from a received signal and supplying the timing signal 20 to the echo canceling circuit 11, the jitter echo canceling circuit 12, the frame pattern generator 14, and the frame pattern inserter 15. Normally, the digital PLL generates jitter corresponding to one clock pulse of a master clock signal while in operation under phase control. The timing controller 16 is controlled in phase such that it generates jitter immediately after the frame pattern inserter 15 has inserted the fixed frame pattern into the signal to be transmitted.

Generally, the signal pattern of an echo that increases when jitter is produced is determined depending on whether the jitter is generated as a leading phase shift or a lagging phase shift, and also on the transmitted symbol pattern corresponding to several baud prior to the generation of the jitter. In this embodiment, since the fixed frame pattern is inserted before the jitter is generated, the signal pattern of an echo caused by jitter is a fixed pattern, and a pseudojitter echo can be determined based only on the information as to whether the jitter is generated as a leading phase shift or a lagging phase shift. That information (phase signal) can be obtained from the PLL, i.e., the timing controller 16. The phase signal thus obtained is applied to the signal generator 13, which generates an input signal to be applied to the jitter echo canceling circuit 12.

The jitter echo canceling circuit 12 generates a pseudojitter echo from an error and the input signal from the signal generator 13. As the echo produced by the jitter is of a fixed pattern, it can be controlled by the information as to whether the jitter is generated as a leading phase shift or a lagging phase shift, e.g., by a signal which is "+1" when the jitter is a leading phase shift, "−1" when the jitter is lagging phase shift, and "0" when no jitter is produced. Therefore, the values held by the shift registers of a transversal filter in the jitter echo canceling circuit 12 are "0" except one shift register. Consequently, the jitter echo canceling circuit 12 effects calculations only at one tap, and hence the echo can be canceled by a relatively small amount of calculations.

The pseudoecho signal produced by the echo canceling circuit 11 is added by the adder 17 to a transmitted signal received from the transmission line. The pseudojitter echo generated by the jitter echo canceling circuit 12 is added by the adder 18 to the transmitted signal received from the transmission line. The transmitted signal to which the pseudoecho signal and the pseudojitter echo are added is then outputted as a received signal to another circuit coupled to the echo canceler, and is also applied to the timing controller 16. The received signal is also supplied to the multiplier 19 where it is multiplied by a suitable constant K into an error signal. The error signal thus generated is supplied to the echo canceling circuit 11 and the jitter echo canceling circuit 12. In the circuit coupled to the echo canceler, the received signal is amplified in order to be controlled at a predetermined level by AGC. The received signal is then inputted in a DEC (Decision Circuit) and is compared with a reference level by a level comparator to determine what the transmitted signal from the outside (Far end signal) represents.

The jitter echo canceling circuit 12 eliminates echoes that cause jitter, whereas the echo canceling circuit 11 eliminates echoes related to the signal pattern to be transmitted. Since the type of signal pattern transmitted is a factor independent of the type of jitter generated, the two circuits do not interact with each other and can be considered independent.

As described above, the timing signal 20 from the timing controller 16 is supplied to the echo canceling circuit 11, the jitter echo canceling circuit 12, the frame pattern generator 14, and the frame pattern inserter 15. However, these circuits 11, 12, 14, 15 are not supplied with the same timing signal 20, but with signals produced by frequency, delaying, or other processing of the timing signal 20.

Figure 4:
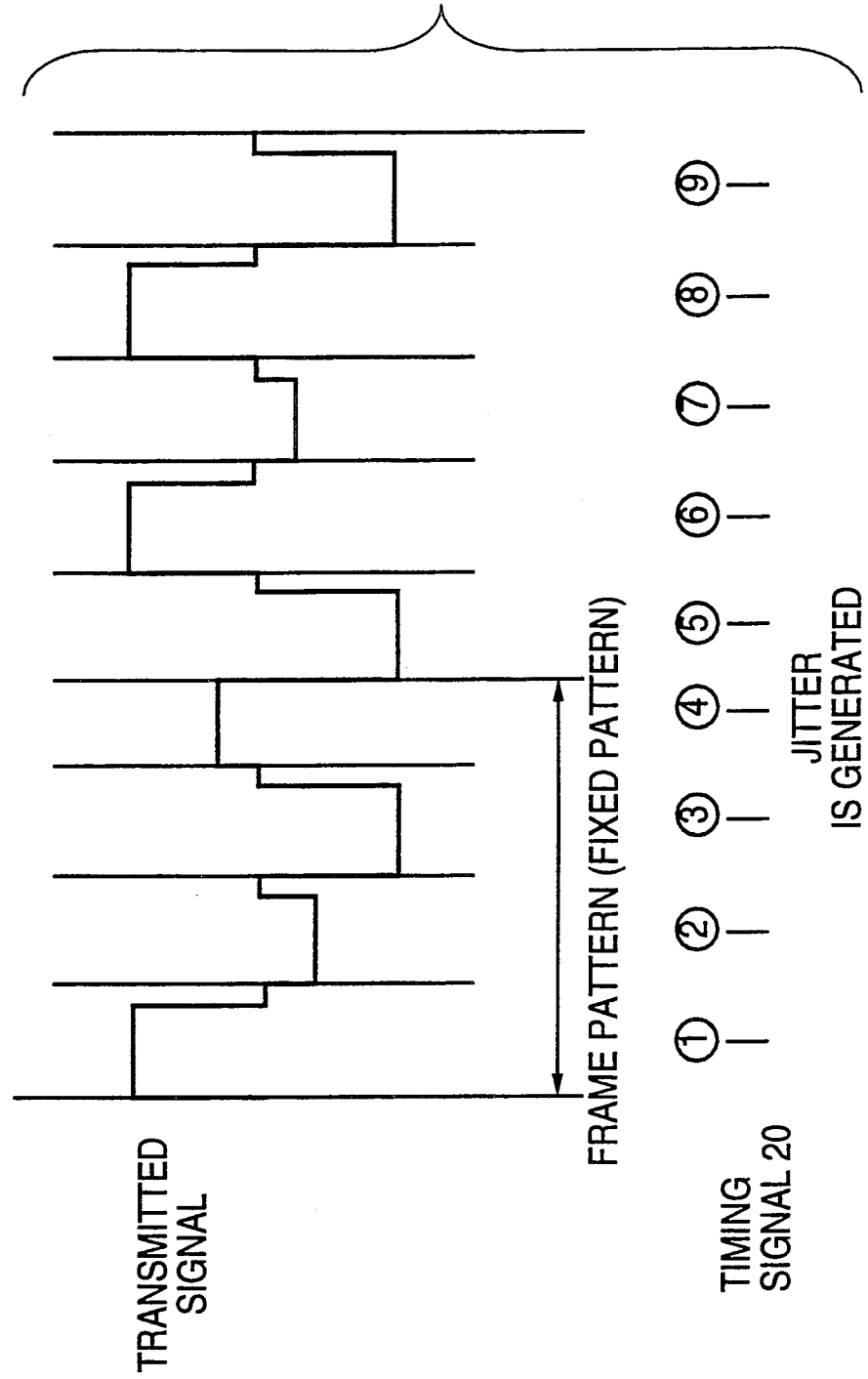
FIG. 4 is a timing chart showing the time at which jitter is generated.
Figure 5:
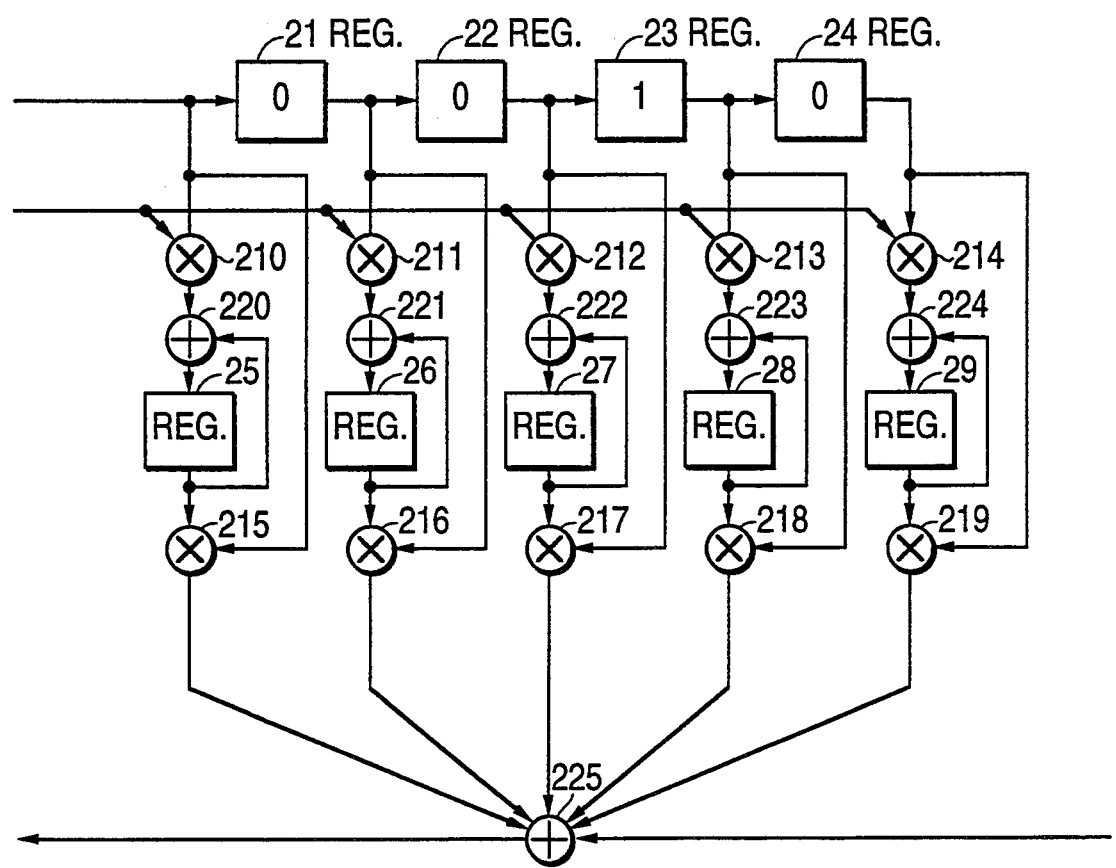
FIG. 5 is a block diagram showing the state of the jitter echo canceling circuit 12 when three timing signals 20 are generated after the jitter is generated.

In the example of a timing chart shown in FIG. 4, the Jitter with a leading phase shift is generated on the fourth timing signal 20 after the fixed frame pattern is inserted into the signal to be transmitted. The jitter echo canceling circuit 12 then enters the state shown in FIG. 5.

Although a certain preferred embodiment of the present invention has been shown and described in detail, it should be understood that various changes and modifications may be made therein without departing from the scope of the appended claims.

What is claimed is:

1. An echo canceler for connection between a transmitter and a receiver of a bidirectional digital transmission device connected to a subscriber's line, for generating a pseudoecho from a signal to be transmitted and an error signal to cancel an echo that is reflected from the transmitter toward the receiver, said echo canceler comprising:

frame pattern generating means for generating a frame pattern;

frame pattern inserting means for inserting said frame pattern periodically into said signal to be transmitted;

echo canceling means for generating a pseudoecho from said signal to be transmitted with said frame pattern inserted therein and an error signal;

timing controlling means for extracting from a modified received signal a timing signal to control said frame pattern generating means, said frame pattern inserting means, and said echo canceling means and for outputting a phase signal indicating whether jitter of said timing signal is generated as a leading phase shift or a lagging phase shift;

jitter echo canceling means for generating a pseudojitter echo from said error signal and said phase signal;

first adding means for adding said pseudoecho to a received signal;

second adding means for adding said pseudojitter echo to an output signal from said first adding means to output said modified received signal; and multiplying means for multiplying said modified received signal by a predetermined value to output said error signal; wherein said timing controlling means includes means for controlling said timing signal to cause the jitter thereof to be generated immediately after said frame pattern is inserted into said signal to be transmitted.

2. The echo canceler according to claim 1, wherein each of said echo canceling means and said jitter echo canceling means comprises an adaptive digital filter.

3. A method of canceling an echo between a transmitter and a receiver of a bidirectional digital transmission device, said method comprising the steps of:

(a) extracting a timing signal from a modified received signal;

(b) generating a frame pattern;

(c) periodically inserting said frame pattern into a signal to be transmitted so as to produce a framed signal under control of said timing signal;

(d) controlling said timing signal so that jitter associated with said timing signal is generated immediately after said frame pattern is inserted into said signal to be transmitted;

(e) generating a pseudoecho from said framed signal and an error signal;

(f) determining whether jitter of said timing signal is generated as a leading phase shift of a lagging phase shift and outputting a phase shift indicating signal;

(g) generating a pseudojitter echo from said error signal and said phase shift indication signal;

(h) adding said pseudoecho and said pseudojitter echo into a received signal to form said modified received signal; and (i) using said modified received signal to generate said error signal.

* * * * *